March 10, 1959
J. R. LOIZZO ET AL
2,876,639
LIQUID MEASURING DEVICE
Filed May 27, 1955
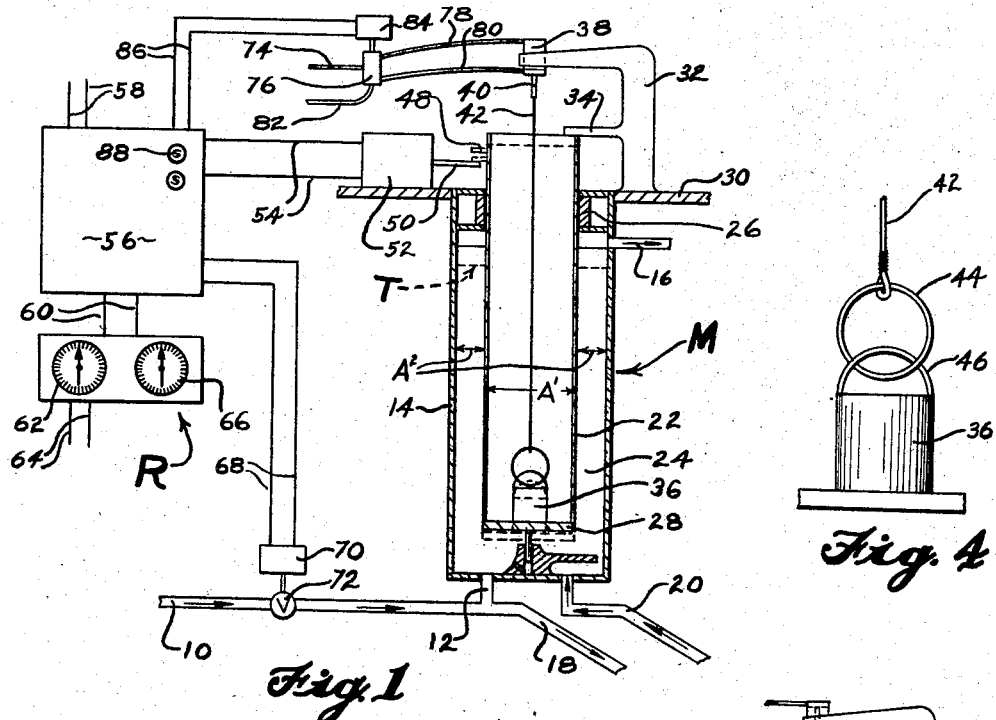
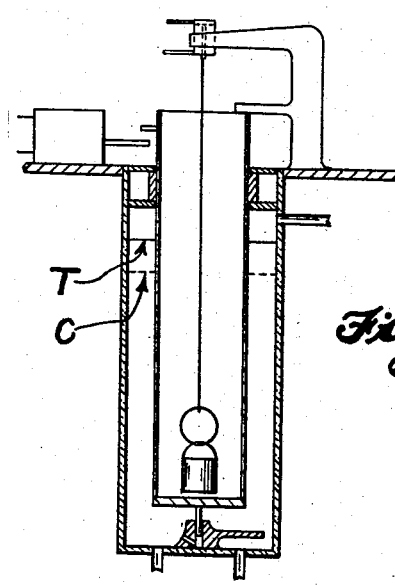
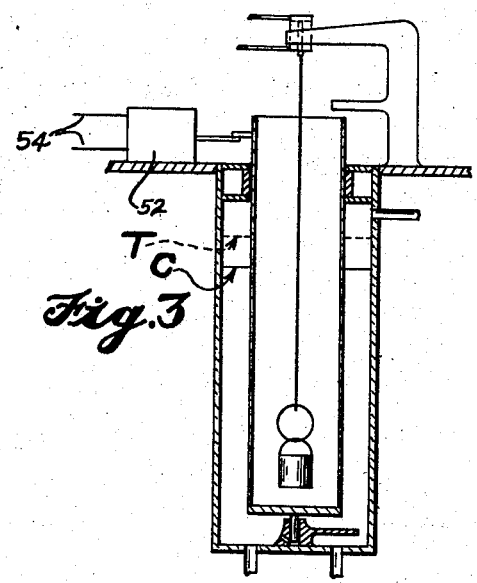
Inventors
JOHN R. LOIZZO
LAWRENCE J. MATTHEWS
By
Emerson B Donnell
Attorney

United States Patent Office 2,876,639
Patented Mar. 10, 1959

2,876,639

LIQUID MEASURING DEVICE

John R. Loizzo and Lawrence J. Matthews, Racine, Wis., assignors to J. I. Case Company, Racine, Wis., a corporation of Wisconsin Application May 27, 1955, Serial No. 511,637

1 Claim. (Cl. 73—113)

The present invention relates to a means for measuring a rate of liquid consumption and an object thereof is to generally improve the construction of such means and the practice of such methods.

More particularly an object is to establish a readily and accurately determinable condition, to change one factor a known amount, and to note the elapsed time required for said accurately determinable condition to be reestablished after the known change in said factor.

A further object is to provide a device which will make possible a precise determination of the predetermined condition both before and after the change in the factor or, specifically, the removal of a known weight from a floating element.

In the practice of the invention a vessel is filled with liquid, for example fuel oil, to a level above a predetermined point. A floating element carrying a weight burden is supported in the body of liquid and preferably restrained from rising to the level which it normally would in view of the prevailing conditions. Liquid is then consumed out of the vessel at the unknown rate which it is desired to measure and at a certain point the floating element will descend in response to lowering of the liquid level. At an arbitrarily predetermined point in this movement a recording mechanism is started after which the weight burden is removed from the floating element, the latter rising into its original position when relieved of the extra weight. In time the continued lowering of the liquid level will cause the floating element to again descend and, when it reaches the exact point at which the timing mechanism was started the timing mechanism is stopped, whereupon according to the well-known laws of physics, the amount of liquid consumed during the elapsed time will be a function of the value of the weight burden which was removed, and the ratio between the area of the bottom of the floating element and the difference between said area and the excess of area of the cross section of the vessel.

In practice it is convenient to make this ratio 1:1, whereupon the fuel used will be exactly equivalent to the weight removed.

The exact mechanisms or components utilized for performing this operation are for the most part conventional and accordingly not disclosed in detail, the drawings therefore being to an extent diagrammatic in character although where it affects the disclosure of the novel features of the invention the actual structure is indicated, the drawings of course being illustrative in character. It is to be understood that variations of a considerable scope may be expected within the contemplation of the invention, and that the same is not to be taken as limited to what is shown and described, or in fact in any manner except as defined in the claim.

In the drawings Figure 1 is a front elevation partly diagrammatic in character of an apparatus suitable for practicing the invention, the liquid vessel and its associated parts being shown in vertical axial section.

Fig. 2 is a view similar to Fig. 1 with parts removed and others in a different position.

Fig. 3 is a similar view with parts in a still different position and;

Fig. 4 is an enlarged elevation of certain mechanism indicated in Fig. 1.

The device comprises in general a liquid measuring section M and a timing or recording section R, the one controlling the other so as to effect the precise measurements hereinbefore mentioned.

Expedients such as the present are commonly used for determining the fuel consumption of engines and the description will be formulated with this in view, although it will be apparent that the purpose for which the liquid is used is not essential to the practice of the invention. Fuel oil for example is supplied through a conduit 10 having a branch 12 leading into a vessel 14, and filling the vessel to an overflow conduit 16, fluid also flowing through a branch 18 to an engine or point of consumption not shown. In case of a test on a diesel or similar engine, a portion of the fuel flowing through branch 18 will be returned through a conduit 20 and branch 12 will supply sufficient fuel to fill the needs of branch 18 and an excess to maintain vessel 14 full to overflow conduit 16. A floating element 22 is supported by floating in the body of liquid 24, guided for free movement in a collar or the like 26 and having a weighted bottom portion 28 so as to tend to float in an upright position in the liquid 24. Vessel 14 is supported from a platform or deck 30 and a bracket 32 carries a stop 34 which engages floating element 22 and limits its upward movement to a convenient position. A weight 36 rests on and is supported by bottom portion 28, the displacement of floating element 22 being sufficient to support itself and weight 36 against stop 34 when vessel 14 is filled to overflow 16.

A suitable lifting means is provided for weight 36 comprising in the present instance a pressure actuated cylinder 38 carried on bracket 32 having a piston rod 40 connected by a tension or flexible element 42 to a ring or the like 44 interengaged with a bale 46 fixed on weight 36. The shape and dimensions of ring 44 and bale 46 together with flexible element 42 are such that ring 44 may hang freely suspended and completely out of contact with bale 46 when floating element 22 is against stop 34, there being a fairly generous amount of free movement or clearance afforded between ring 44 and bale 46 under these conditions. In this way none of the weight of element 42 or ring 44 is imposed upon floating element 22 in spite of movements of floating element 22 within the range permitted. Weight 36 is accurately calibrated to be equal to one pound or some other convenient unit which it is desired to use in measuring the liquid. As will be apparent floating element 22 will rise to a different height with weight 36 resting therein than it will with weight 36 suspended from flexible element 42. Conversely element 22 will float at the same height after weight 36 is removed by element 42 if the level of liquid in vessel 14 is lowered a predetermined amount and it is this principle which is utilized in performing the measuring operation.

Element 22 has a finger or portion 48 which registers, when element 22 descends, with a trip or trigger 50 forming part of a sensitive switch 52 of well-known type, switch 52 being connected by leads 54 with a cycling switching mechanism or relay assemblage generally designated as 56, the necessary electric current being supplied through leads 58 from any convenient source.

Relay assemblage 56 is made up of well-known components not shown, and such arrangements being familiar to those skilled in the art need not be described other than to state the functions or results accomplished, the choosing of suitable components, once the desired results are known being a simple matter for one familiar with this type of apparatus. Mechanism 56 is connected by means of leads 60 to above-mentioned recording unit R which contains a group of instruments sufficient for the tests desired. In the present instance a revolution counting mechanism 62 receives the necessary electrical energy through leads 60, and is controlled through leads 64 connecting to suitable or well-known circuit controlling mechanism not shown and connected with the engine being tested. Recording mechanism R also carries a time recording dial 66 of any suitable or well-known type which may be started and stopped to indicate elapsed time as will appear.

Other leads 68 connect to a solenoid or the like 70 which controls a shutoff valve 72 interposed in conduit 10.

Pressure cylinder 38 is actuated by any suitable pressure fluid supplied through a pipe 74 and controlled by a valve 76, fluid being transmitted and exhausted from cylinder 38 through pipes 78 and 80 controlled by valve 76, spent fluid being exhausted through a pipe 82. Valve 76 is controlled by means of a solenoid or the like 84 connected with switching mechanism 56 by means of leads 86.

The operation of the mechanism in carrying out the invention should be clear from the foregoing but an outline of a typical test cycle would be as follows. The engine or liquid consuming unit would be set into operation, receiving its fuel or the like through conduit 10 or valve 72 and branch 18, sufficient excess fluid flowing into vessel 14 to fill it and maintain it filled to overflow 16. This condition may continue as long as necessary to establish stable conditions in the liquid consuming unit. For example a diesel engine can be "run in" and then adjusted to a known power output and when operating satisfactorily a fuel consumption test can be initiated by pressing a starting button 88. Cycling mechanism 56 will then go through the following sequence of events. First a current impulse fed into solenoid 70 will close valve 72. This will shut off the liquid supply so that the engine will take its entire requirements from vessel 14. Under these conditions piston rod 40 will be in its lowered position and weight 36 will be supported entirely by the buoyancy of floating element 22, ring 44 hanging freely and out of contact with bale 46. The level of liquid in vessel 14 will of course begin to fall as the liquid is used and when it reaches the vicinity of the level indicated at T floating element 22 will begin to fall with the liquid level in vessel 14, and at some predetermined point (the exact point is not critical) portion 48 will actuate trigger 50 and close a circuit through leads 54 causing cycling mechanism 56 to start the action of timing dial 66 and revolution counter 62. Switching mechanism 52 is very accurately made so that it will close its circuit repeatedly at virtually exactly the same position, as floating element 22 descends from time to time. When or shortly after timing mechanism 66 is started, cycling mechanism 56 transmits an impulse to solenoid 84 causing piston rod 40 to rise and, through tension element 42 take up the clearance between ring 44 and bale 46 and lift weight 36 completely free of bottom portion 28 of floating element 22. Element 22 relieved of weight 36 again floats into contact with stop 34 relieving the pressure on trigger 50. Cycling mechanism 56 however continues to actuate revolution counter 62 and timing mechanism 66 and waits for a second impulse from switching mechanism 52, the situation then being as shown in Fig. 2. After enough fluid is used so that the level in vessel 14 approaches the new level C indicating completion of the test, floating element 22 will begin to fall a second time until portion 48 again contacts trigger 50, and at substantially exactly the same position in which it previously actuated switch 52 it will again close a circuit in leads 54 which in well-known manner will cause cycling mechanism 56 to stop the action of revolution counter 62 and timing mechanism 66, the situation at this stage being shown in Fig. 3. The difference in displacement of floating element 22 with weight 36 on and with weight 36 off is reflected in the difference between levels T and C and with area $A^1$ equal to area $A^2$, in accordance with well-known principles of physics, the weight of liquid represented by this difference in level will be the same as the weight 36 which was removed from the floating element after the start of the test. The engine under test then made, as a result of the consumption of fuel equal to weight 36, the number of revolutions indicated on dial 62, and in the number of seconds or minutes indicated on dial 66. These data plotted against the known power output will give the output per unit weight of fuel, or a measure of the efficiency of the engine as is familiar to those skilled in testing engines.

In the past a practical difficulty has been to get the engine—often a new one which has never been run before—into stable running condition and then to measure accurately the amount of fuel used in a given time. In the present device there is no interference with the running of the engine, and when the test is run the amount of fuel used is measured automatically, independently of any possible human error, and with the utmost accuracy.

If desired, cycling mechanism 56 can readily be set up to reopen valve 72 and to shift valve 76 so as to lower piston rod 40 whereupon in due course vessel 14 will refill to overflow 16 and the device will be ready for another cycle of operation. It goes without saying that the liquid passing out of overflow 16 may be recovered and returned to the initial supply not shown.

As will be apparent a number of potential sources of error common to well-known apparatus and procedures have been eliminated by this arrangement. There are no flexible conduits or any other connections to the floating element 22, it is free to move up and down in reservoir 14 with the least possible interference from any guiding means or other incumbrance insofar as the movement necessary to trip switch 52 is concerned. It is not necessary to read one liquid level for start and another for completion of the test, the conditions being virtually exactly the same insofar as the level sensing expedient is concerned when the test is completed as they were when it started. There is plenty of opportunity to make adjustments and make sure that the engine or other device is working satisfactorily before test is started and the human element is entirely eliminated since both the start and the completion of the test are effected automatically and with extreme accuracy by the repeated tripping of switch 52 at exactly the same position of floating element 22 in each instance.

Minor variations are of course contemplated. For example solenoid 84 might readily be given sufficient travel to raise weight 36 directly without the interposition of valve 76 and cylinder 38. Other configurations might be given to the vessel 14 and floating element 22, and still other variations will occur to those skilled in the art. What is claimed as new however and desired to be secured by Letters Patent of the United States is:

In a device for testing liquid consumption the combination of a liquid receiving and dispensing vessel, a supply conduit for liquid leading to said vessel and having shutoff valve means in relation thereto to control the flow of liquid into said vessel, a conduit leading from said vessel to a point of consumption of liquid, an overflow conduit leading from said vessel at a maximum desirable liquid level, a floating element supported in said vessel by virtue of displacement of liquid therein, a known weight burden supported on said floating element, a trip means fixedly supported in relation to said vessel and engaged by said floating element at a predetermined position thereof, a fluid cylinder supported over said weight burden and having a fluid actuated piston rod, a tension element connecting said piston rod with said weight burden, a lost motion means interposed in said tension means to provide for free floating of said floating element without interference from said tension means, a source of pressure fluid for said cylinder, distributing valve means connected with said source and to said cylinder for controlling the motion of said piston rod, a cycling switching mechanism connected with said trip means, control means for said shutoff valve connected with said cycling means, actuating means for said distributing valve connected with said cycling means and time recording means connected to be started and stopped by said cycling means, said cycling means being conditioned upon starting to close said shutoff valve and, upon actuation of said trip by settling of said floating means as a result of consumption of liquid, to start said time recording means and to actuate said distributing valve whereby fluid pressure in said cylinder will cause upward movement of said piston rod, taking up said lost motion and lifting said weight burden clear of said floating means, and said cycling mechanism in response to a second actuation of said trip means as a result of settling of said floating means after said weight burden has been removed to stop said time recording means, to reopen said shutoff valve and to actuate said distributing valve to cause said pressure fluid to lower said piston rod.

References Cited in the file of this patent
UNITED STATES PATENTS

| | | |
|---|---|---|
| 1,589,068 | Givens | June 15, 1926 |
| 1,800,640 | Jehle et al. | Apr. 14, 1931 |
| 2,614,578 | Stickney | Oct. 21, 1952 |